(12) United States Patent
Suzuki et al.

(10) Patent No.: US 7,619,335 B2
(45) Date of Patent: Nov. 17, 2009

(54) VIBRATION MOTOR

(75) Inventors: Kazuhisa Suzuki, Koriyama (JP); Noboru Segawa, Saitama (JP)

(73) Assignee: Nidec Copal Corporation, Tokyo (JP)

( * ) Notice: Subject to any disclaimer, the term of this patent is extended or adjusted under 35 U.S.C. 154(b) by 294 days.

(21) Appl. No.: 11/784,185

(22) Filed: Apr. 4, 2007

(65) Prior Publication Data

US 2007/0241626 A1    Oct. 18, 2007

(30) Foreign Application Priority Data

Apr. 14, 2006    (JP)    ............................. P2006-112307

(51) Int. Cl.
*H02K 23/00*    (2006.01)
*H02K 7/065*    (2006.01)
*H02K 1/18*    (2006.01)
*B06B 1/16*    (2006.01)

(52) U.S. Cl. .......................................... 310/81; 310/91
(58) Field of Classification Search .................. 310/71, 310/81, 91
See application file for complete search history.

(56) References Cited

U.S. PATENT DOCUMENTS

| | | | | |
|---|---|---|---|---|
| 5,952,745 A | * | 9/1999 | Yasuda | 310/40 MM |
| 5,986,367 A | * | 11/1999 | Tsuzaki et al. | 310/71 |
| 6,081,055 A | * | 6/2000 | Narusawa | 310/81 |
| 6,133,657 A | * | 10/2000 | Semenik et al. | 310/81 |
| 2008/0309180 A1 | * | 12/2008 | Suzuki et al. | 310/81 |

FOREIGN PATENT DOCUMENTS

| | | | |
|---|---|---|---|
| EP | 817551 | * | 1/1998 |
| EP | 0840424 | * | 5/1998 |
| JP | 3004537 | * | 9/1994 |
| JP | 10-336938 | * | 12/1998 |
| JP | 11-114496 | * | 4/1999 |
| JP | 11-234943 | | 8/1999 |
| JP | 2005-198366 | * | 7/2005 |
| WO | 97-40568 | * | 10/1997 |
| WO | 2006-016518 | * | 2/2006 |
| WO | 2006-104003 | * | 5/2006 |

* cited by examiner

*Primary Examiner*—Burton Mullins
(74) *Attorney, Agent, or Firm*—Beyer Law Group LLP

(57) ABSTRACT

A vibration motor having a tubular case, a shaft protruding from a front end of the case, a weight eccentrically fixed to an end of the shaft, and a metallic holder surrounding the case, the holder being surface-mounted on a wiring board by reflow-soldering, wherein the holder has a planate bottom placed on the wiring board, a pair of forward tilting prevention portions that extends up to a position facing the weight is formed at the bottom, a notch is provided on a center line extending along the bottom between the forward tilting prevention portions, and the notch extends from the front end of the forward tilting prevention portions beyond the position facing the weight.

8 Claims, 11 Drawing Sheets

Fig.11
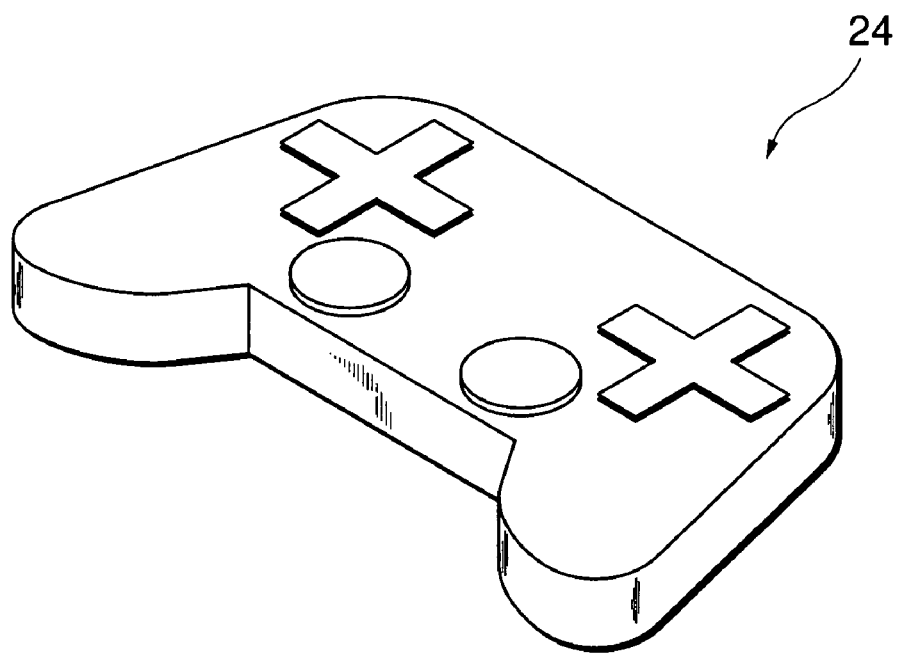
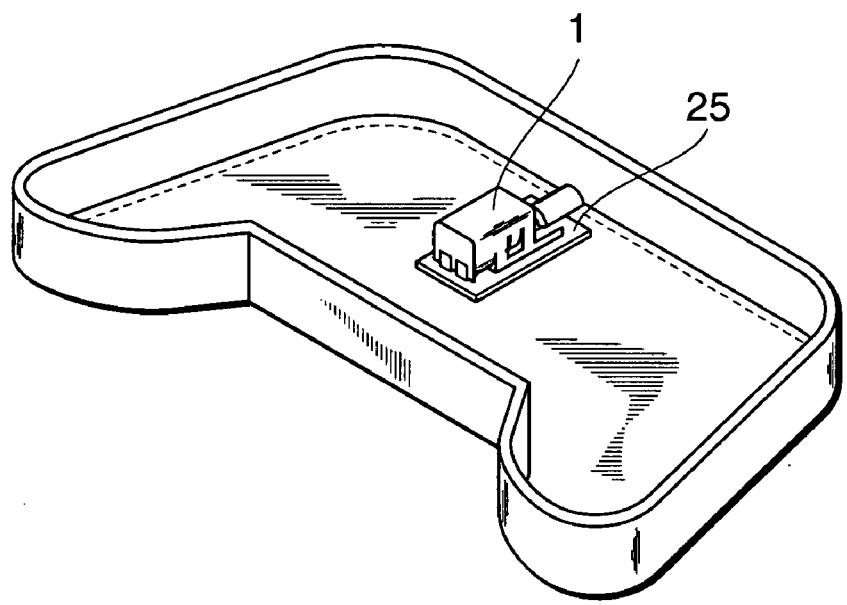

VIBRATION MOTOR

BACKGROUND OF THE INVENTION

1. Field of the Invention

The present invention relates to a vibration motor incorporated in various communication apparatuses (for example, mobile phones), game machines, or massaging equipment and to be used as a vibration generating source.

2. Related Background of the Invention

A vibration motor has, for example, an approximately cylindrical case arranged along a direction of an axis of rotation of a shaft and a weight is eccentrically fixed to a tip of the shaft protruding from a front end of the case. A rotor and stator are accommodated in the case. A coil of the rotor is connected to a commutator and a brush slidingly contacts with the commutator. A terminal, which is connected to the brush and protrudes out of the case, is in contact with a conductor on a printed wiring board to receive power. Then, a current flows from the terminal to the coil through the brush and commutator, torque of the rotor is generated to rotate the shaft, and the weight is swung around to cause vibration.

For a vibration motor surface-mounted on a printed wiring board, a metallic holder for holding a case may be provided to solder the vibration motor by reflow-soldering or the like. Vibration motors of this type include one (See Patent Document 1) that holds a cylindrical case with a pair of right and left bent springs rising up from a bottom which is in contact with a printed wiring board and provided in a holder, and one (See Patent Document 2) whose holder bottom is extended in the direction of the axis of rotation of a shaft to prevent detachment of the vibration motor from the printed wiring board.

[Patent Document 1] Japanese Patent Application Laid-Open No. 11-234943

[Patent Document 2] Japanese Patent Application Laid-Open No. 2005-198366

With increasing miniaturization of various kinds of precision apparatuses, further miniaturization of vibration motors incorporated in such precision apparatuses has been demanded as well. Since a vibration motor must be miniaturized while maintaining a gravity of the weight, if the size of the shaft in the direction of the axis of rotation becomes shorter, the position of a center of gravity of the vibration motor shifts, as a result, toward a front end side (weight side) of the case. Thus, for the vibration motor described in Patent Document 1 in which a terminal is provided on a rear end side of the case, the weight tilts forward if the vibration motor is simply put on a wiring board, increasing a risk of the terminal or a rear side of the holder being detached from the wiring board and making it difficult to provide suitable soldering. For the vibration motor described in Patent Document 2, on the other hand, the bottom of the case is extended to the weight side and thus the vibration motor is stable on the wiring board. However, since the extended bottom becomes a hindrance to the weight in the vibration motor described in Patent Document 2, the radius of rotation of the weight is limited, forcing downsizing of the weight.

An object of the present invention is to provide a vibration motor that enables upsizing of a weight in a centrifugal direction while stabilizing the vibration motor on a wiring board.

SUMMARY OF THE INVENTION

The present invention is a vibration motor having a tubular case accommodating a rotor and stator, a shaft protruding from a front end of the case, a weight eccentrically fixed to an end of the shaft, and a metallic holder surrounding the case, the holder being surface-mounted on a wiring board by reflow-soldering, wherein the holder has a planate bottom placed on the wiring board, a pair of forward tilting prevention portions that extends up to a position facing the weight is formed on the weight side at the bottom, a notch on a center line extending in parallel with an axis of rotation of the shaft and along the bottom is provided between the forward tilting prevention portions, and the notch extends from the front end of the forward tilting prevention portions beyond the position facing the weight.

As a vibration motor becomes smaller, a shift of the position of an overall center of gravity increases, making the weight side more likely to tilt forward on a wiring board when mounted. However, since the vibration motor has a pair of forward tilting prevention portions extending up to the position facing the weight formed on the weight side at the bottom of the holder, the vibration motor is made more difficult to tilt forward to the weight side, with the forward tilting prevention portions acting as a support, stabilizing a seat of the vibration motor on the wiring board when mounted. As a result, the vibration motor can reliably be soldered to the wiring board by reflow-soldering and a soldered portion can be made more unlikely to separate even if a dropping impact is received. In addition, further miniaturization of a small vibration motor is demanded, while on the other hand, upsizing of the weight is demanded as well. Thus, a notch is provided between a pair of forward tilting prevention portions on the center line extending along the bottom, and therefore the radius of rotation of the weight can be increased by board thickness at the bottom by the notch. This enables upsizing of the weight in the centrifugal direction. If the radius of rotation of the weight can be increased by board thickness even though the board thickness of the bottom is, for example, less than 0.5 mm, the weight can have a very great influence on overall vibration by increasing the radius of rotation of the weight only slightly due to smallness of the vibration motor. Consequently, the present invention is very effective in promoting miniaturization of the vibration motor.

A slit extending from the end in the direction of the center line of the notch to the rear end of the bottom is preferably formed at the bottom of the holder. A slit is formed in a holder when forming the holder, and therefore the holder easily broadens outwardly by the slit. Thus, by providing a slit to a bottom side placed on a wiring board, the slit can be arranged on the wiring board when mounting a motor and thus broadening of the slit can be stopped with solder while simultaneously soldering the bottom and wiring board. Therefore, even when the vibration motor receives a dropping impact, it becomes possible to prevent broadening of the holder and to appropriately avoid a motor part from protruding from the holder.

It is preferable that the holder be formed in a rectangular cross-sectional shape from a bottom, a pair of flanks erected from both sides of the bottom, and a top bridging the flanks, and claws that are in contact with an outer surface of the case and bias the case toward an inner wall surface of the top are provided on the pair of flanks. The holder has a rectangular cross-sectional shape and thus if, for example, a cylindrical case is surrounded by the holder, an area where the case and holder are in contact will become smaller. As a result, it becomes harder to conduct heat to the case via the holder when soldering the holder to the wiring board, reducing an influence of heat on the vibration motor. Further, since claws that are in contact with an outer surface of the case and bias the case toward an inner wall surface of the top are provided on a pair of flanks, the case is lifted in a direction away from the bottom to separate the bottom from the case, and as a result, an influence of heat on the vibration motor can be reduced when soldering the bottom to the wiring board. Further, since the top of the holder is planate, suction by an adsorption nozzle of a mounting machine can be maintained in an excellent state.

The forward tilting prevention portions preferably have the flanks erected continuously from the holder. The flanks are erected in such a manner, and therefore material strength such as flexural strength and impact strength can be increased when compared with a case in which the forward tilting prevention portions are formed solely of flat plates.

Also, a communication apparatus or game machine according to the present invention is characterized by including a wiring board on which the aforementioned vibration motor is mounted.

Also, a vibration motor according to the present invention is one having a tubular case accommodating a rotor and stator, a terminal protruding from the case, a shaft protruding from a front end of the case, a weight eccentrically fixed to an end of the shaft, and a metallic holder surrounding the case, the terminal and the holder being surface-mounted on a wiring board by reflow-soldering, wherein the holder has a planate bottom placed on the wiring board, a pair of forward tilting prevention portions that extends up to a position facing the weight is formed on the weight side at the bottom, a notch is provided on a center line in parallel with the axis of rotation of the shaft and extending along the bottom between the forward tilting prevention portions, and the notch extends from the front end of the forward tilting prevention portions beyond the position facing the weight.

As a vibration motor becomes smaller, a shift of the position of the overall center of gravity increases, making the weight side more likely to tilt forward on a wiring board when mounted. Since the vibration motor has a pair of forward tilting prevention portions extending up to the position facing the weight formed on the weight side at the bottom of the holder, the vibration motor is made more difficult to tilt forward to the weight side, with the forward tilting prevention portions acting as a support, stabilizing the seat of the vibration motor on the wiring board when mounted. Also, a notch is provided between a pair of forward tilting prevention portions on the center line extending along the bottom and the radius of rotation of the weight can be increased by board thickness at the bottom by the notch. This enables upsizing of the weight in the centrifugal direction.

According to the present invention, upsizing of a weight in the centrifugal direction is enabled while stabilizing a vibration motor on a wiring board.

BRIEF DESCRIPTION OF THE DRAWINGS

FIG. 11 is an exploded perspective view showing a game controller equipped with the wiring board on which the vibration motor is mounted.

DESCRIPTION OF THE PREFERRED EMBODIMENTS

Figure 1:
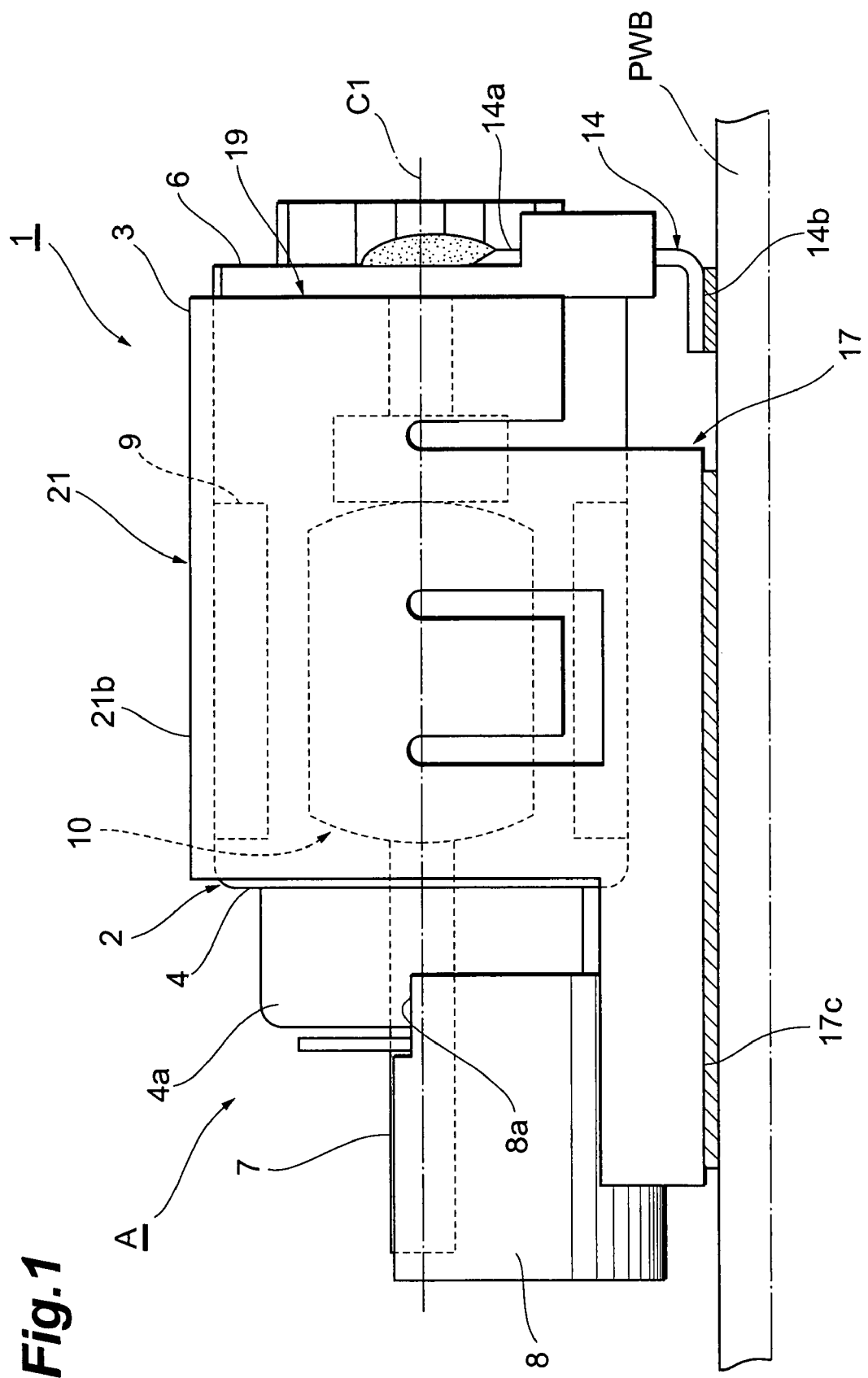
FIG. 1 is a side view showing an embodiment of a vibration motor according to the present invention.

A suitable embodiment of a vibration motor according to the present invention will be described in detail below with reference to drawings.

As shown in FIG. 1 to FIG. 4, a vibration motor 1 is a small vibration motor surface-mounted on a printed wiring board PWB by reflow-soldering, and includes a motor part A having a tubular case 2 of about 4 mm in diameter and about 10 mm in length and a holder 3 in a tubular and rectangular cross-sectional shape into which the tubular case 2 is press-fitted.

The tubular case 2 is comprised of a metallic cylindrical housing 4 and a resin bracket 6 press-fitted into an open rear end of the housing 4. A protruding neck 4a is formed by contraction on the front end side of the housing 4 and a portion of a shaft 7 protrudes from the front end of the neck 4a. A weight 8 whose cross section is fan-shaped is eccentrically fixed to the end of the shaft 7 by crimping or press fitting. A dent 8a into which a portion of the neck 4a is fitted is formed on the rear end side of the weight 8. The shaft 7 is pivotally supported by the tubular case 2 via a bearing fixed inside the neck 4a and a bearing fixed to the bracket 6.

In the motor part A, a stator 9 consisting of permanent magnets bonded to the inner wall surface and a rotor 10 surrounded by the stator 9 and fixed to the shaft 7 are accommodated inside the tubular case 2. A coil is wound around a core of the rotor 10 and the coil is connected to a commutator fixed to the shaft 7 on the rear end side of the tubular case 2. A pair of brushes fixed to the bracket 6 is slidingly contact with the commutator.

The bracket 6 has a cylindrical front portion press-fitted into the tubular case 2 and a rectangular rear portion insertable into the holder 3. Connection terminals 12a and 12b provided at brush ends are embedded in the bracket 6. The pair of connection terminals 12a and 12b is exposed from the rear end of the bracket 6, and external terminals 13 and 14 are soldered to the connection terminals 12a and 12b of brush respectively. Each of the pair of the external terminals 13 and 14 is a copper sheet bent in L-shape. Ends 13a and 14a on one side of the external terminals 13 and 14 are in contact with the rear end of the bracket 6 and soldered to the connection terminals 12a and 12b, and ends 13b and 14b on the other side are directed toward the weight 8 side and extend in parallel with an axis of rotation C1 of the shaft 7 (See FIG. 1). The ends 13b and 14b of the external terminals 13 and 14 are reflow-soldered on the printed wiring board PWB.

Figure 5:
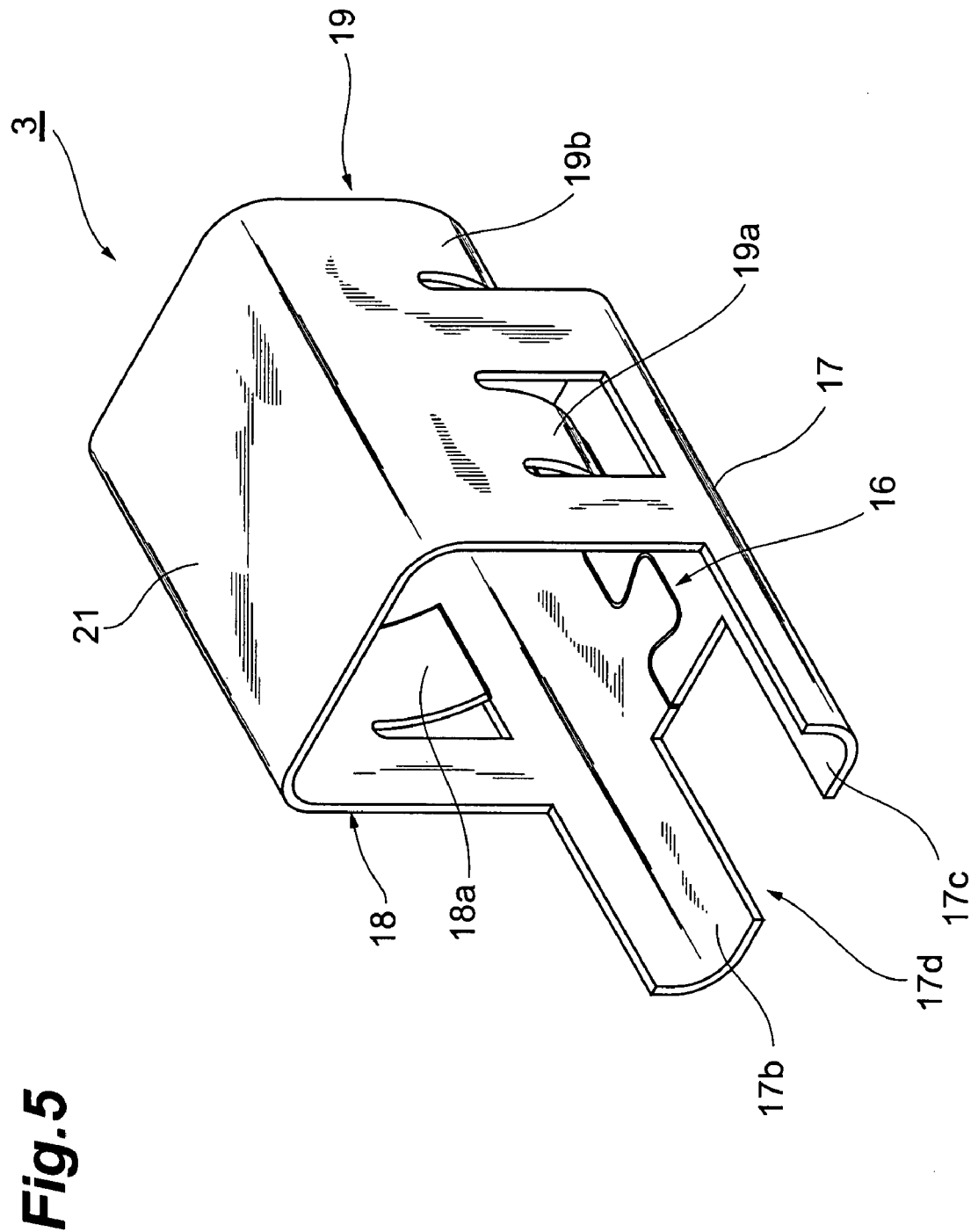
FIG. 5 is a perspective view showing a holder adopted for the vibration motor according to the present invention.
Figure 6:
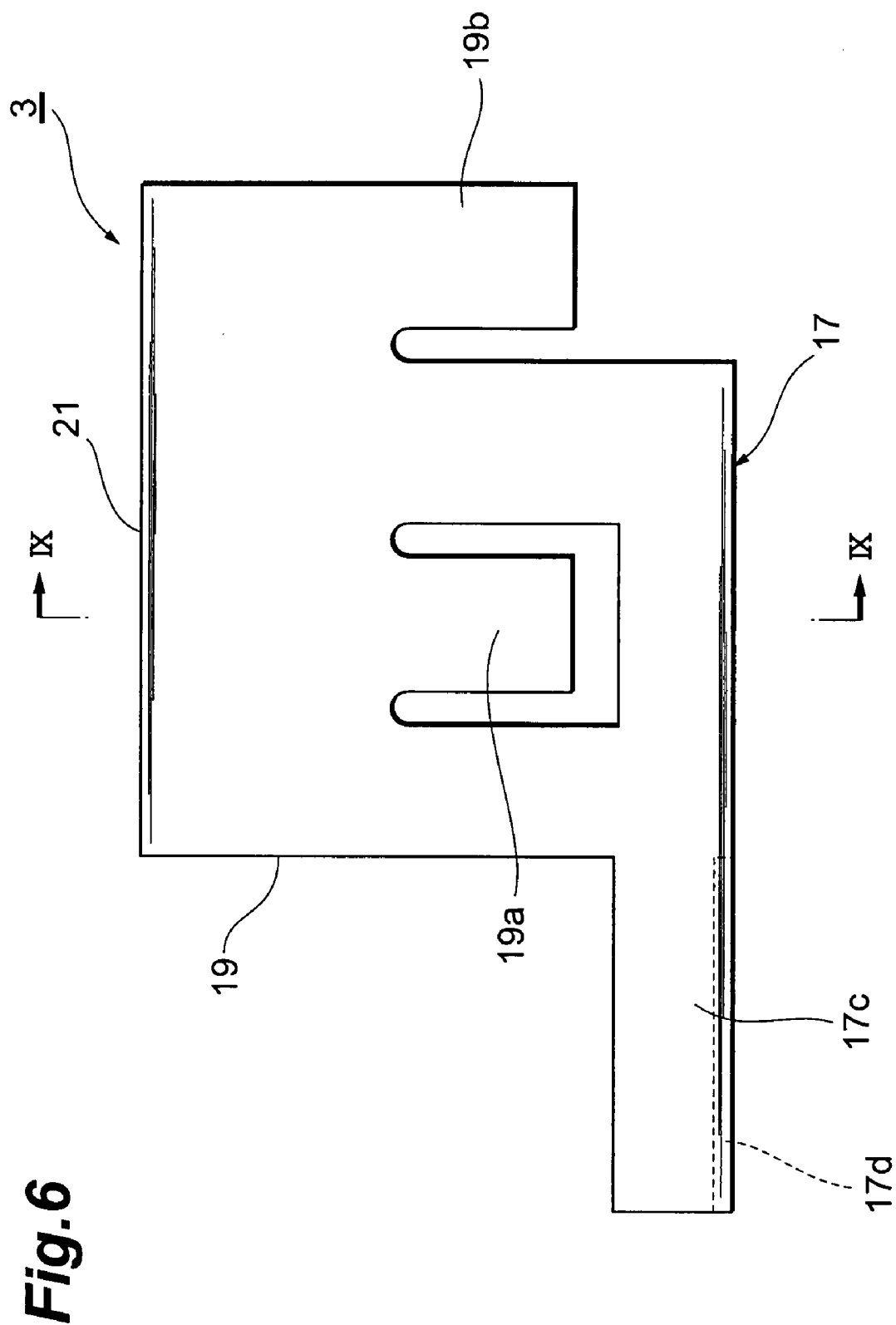
FIG. 6 is a side view showing the holder adopted for the vibration motor according to the present invention.
Figure 7:
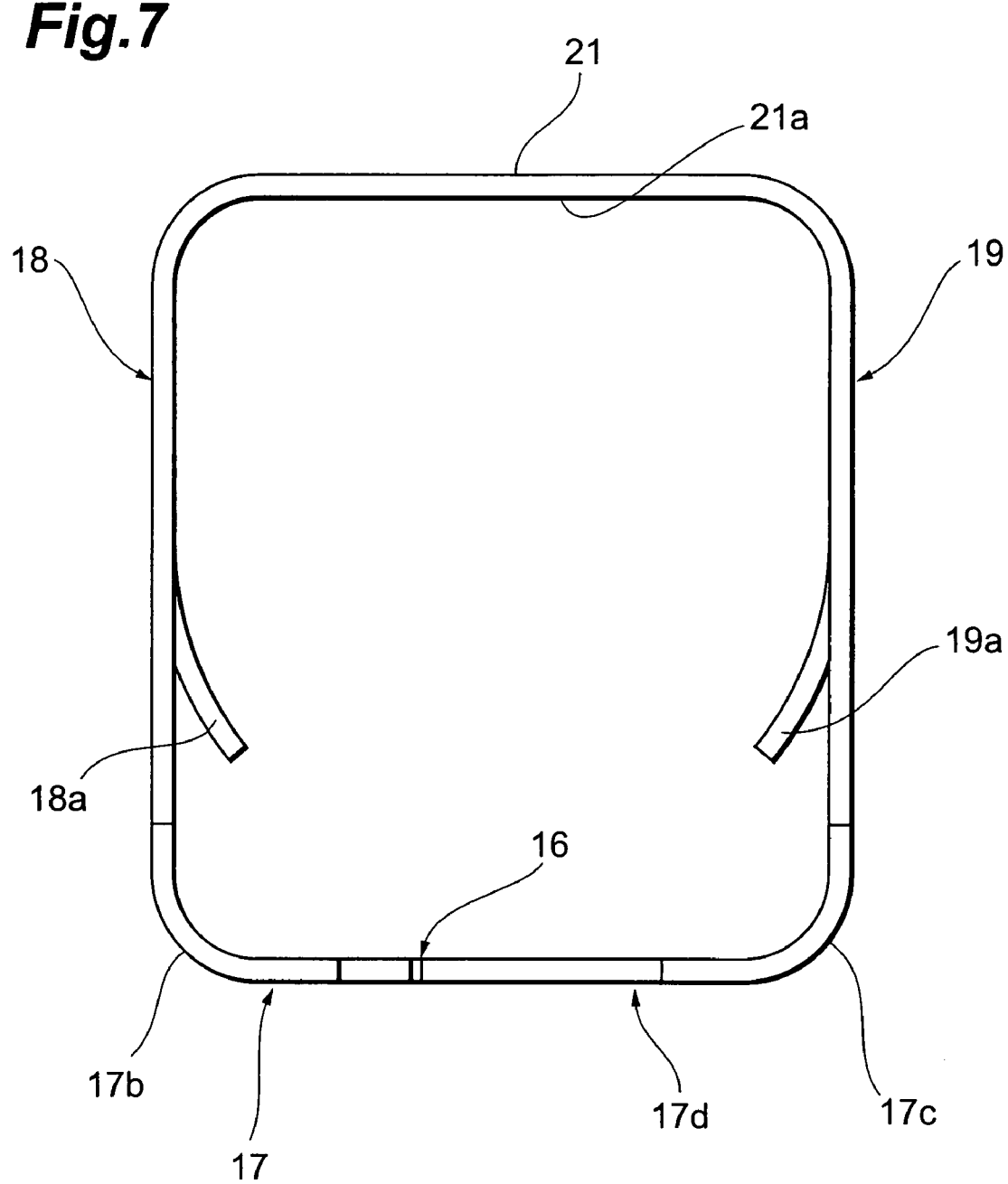
FIG. 7 is a front view showing the holder adopted for the vibration motor according to the present invention.
Figure 8:
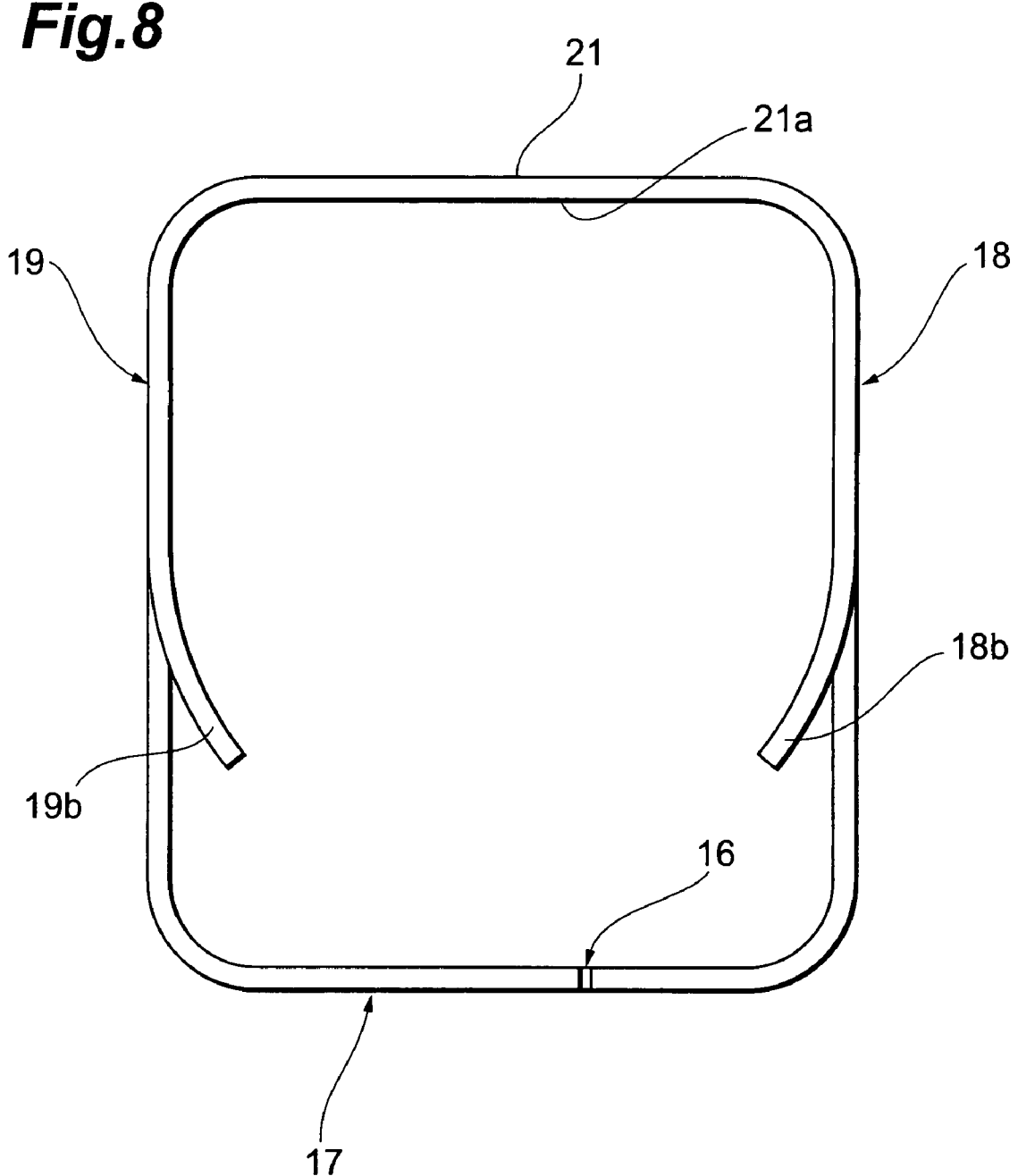
FIG. 8 is a rear view showing the holder adopted for the vibration motor according to the present invention.
Figure 9:
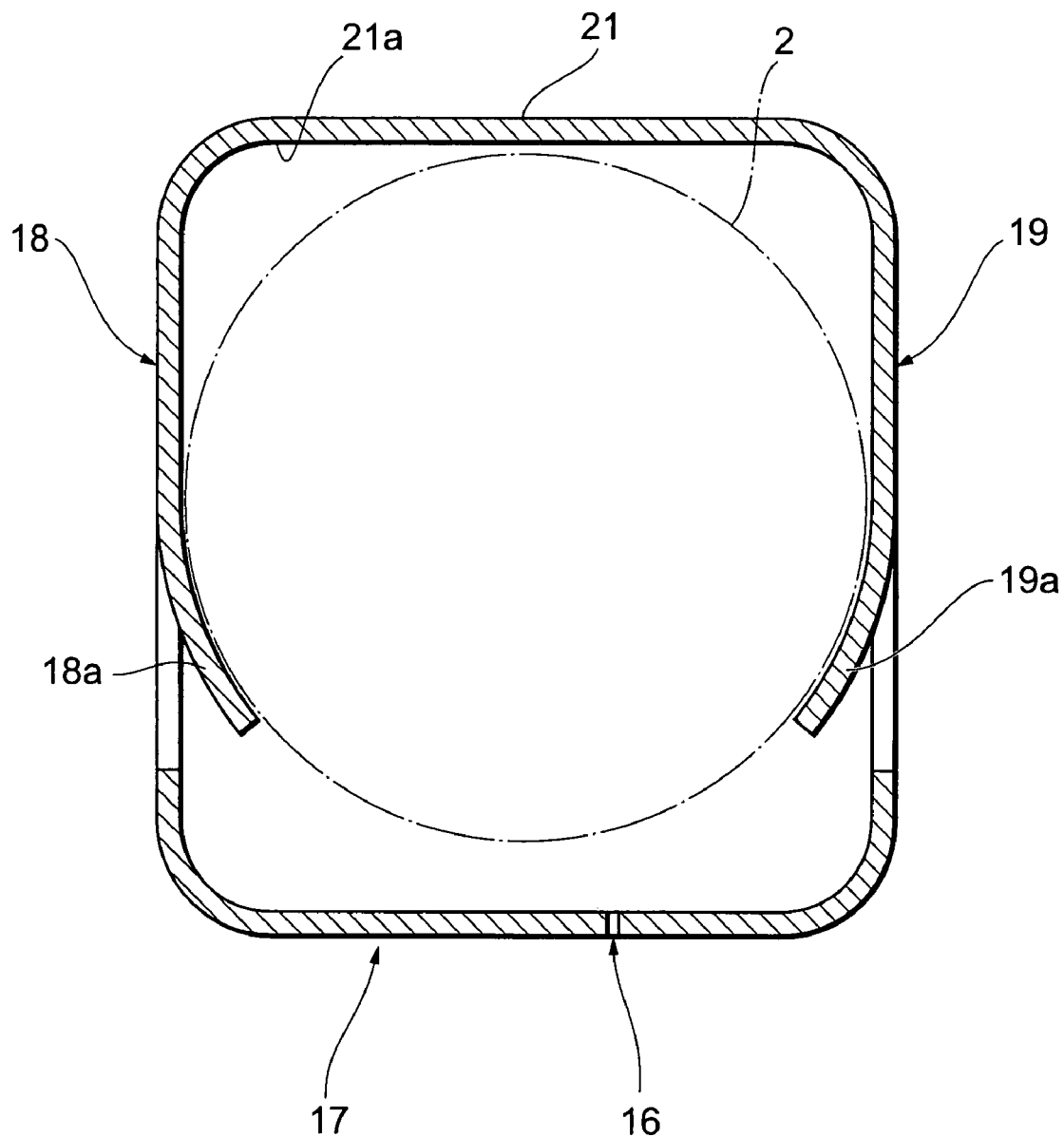
FIG. 9 is a sectional view along an IX-IX line in FIG. 6.

As shown in FIG. 5, the holder 3 with board thickness of 0.2 mm into which the tubular case 2 is press-fitted is formed by stamping out a stainless flat plate to a predetermined shape and then bending the flat plate to a rectangular cross-sectional shape and joining ends together. The holder 3 is comprised of a planate bottom 17 in which a joint 16 is formed, a pair of flanks 18 and 19 erected from the right and left sides of the bottom 17, and a planate top 21 bridging both the flanks 18 and 19.

Figure 2:
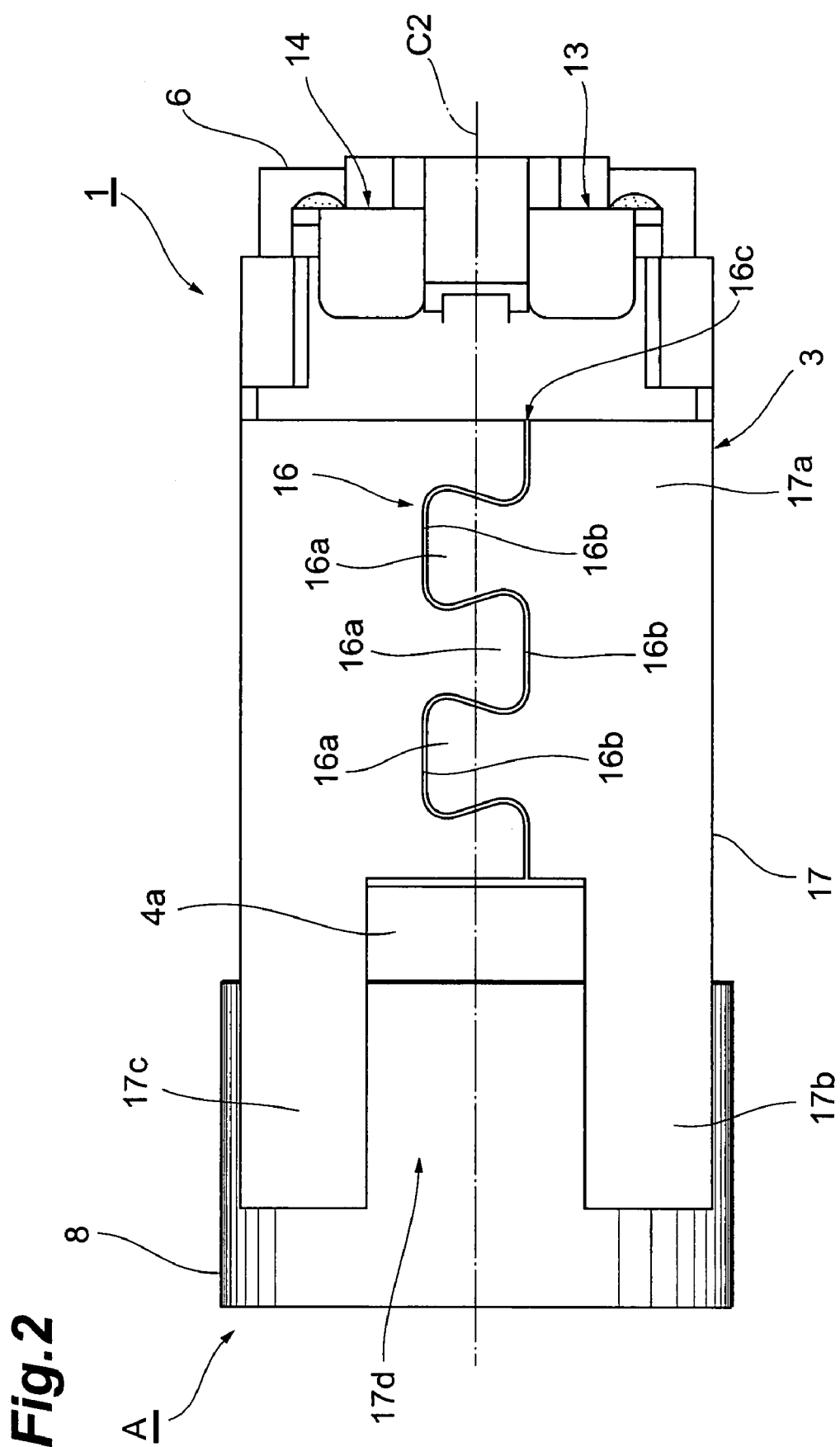
FIG. 2 is a bottom view showing the embodiment of the vibration motor according to the present invention.
Figure 3:
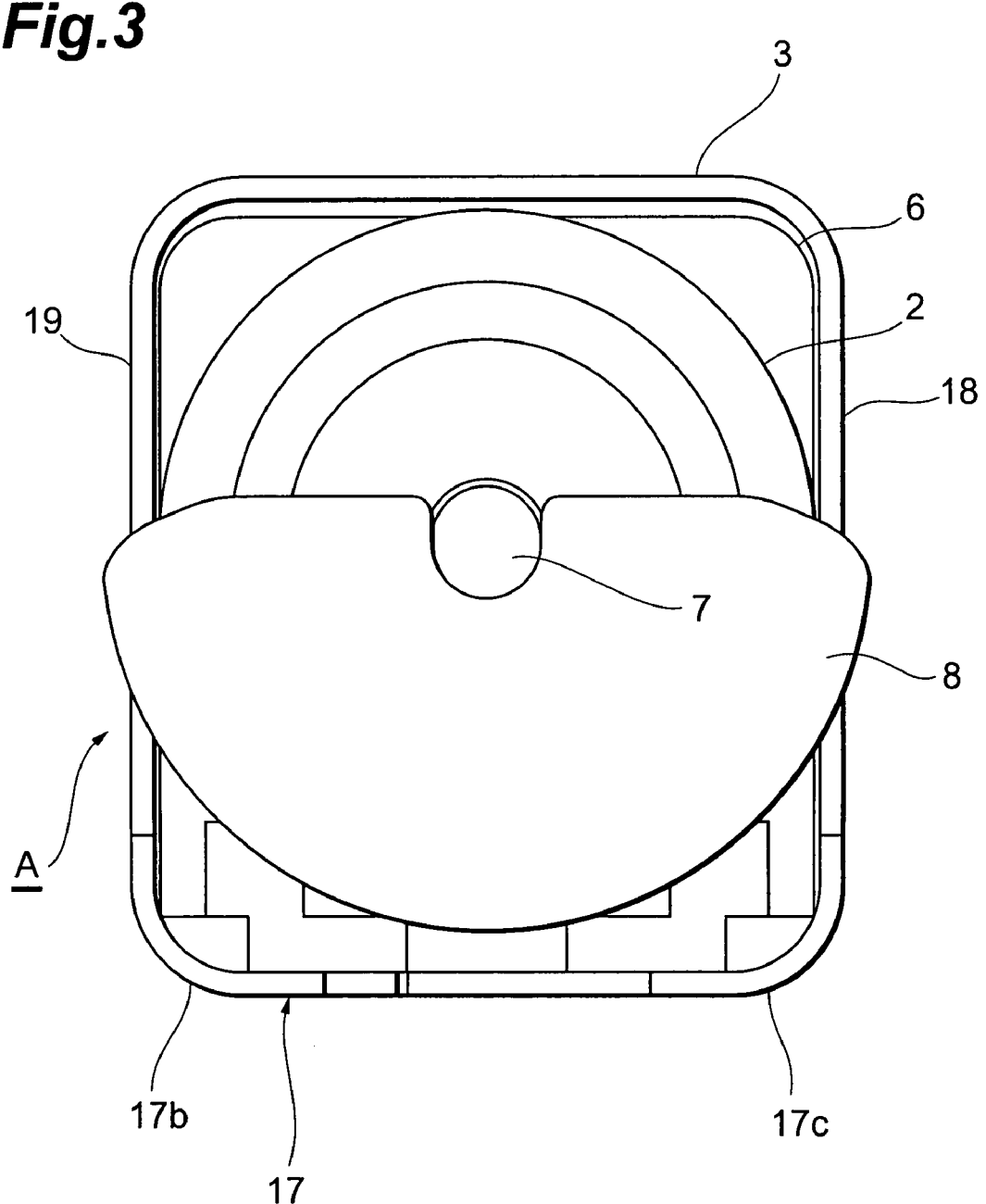
FIG. 3 is a front view showing the embodiment of the vibration motor according to the present invention.
Figure 4:
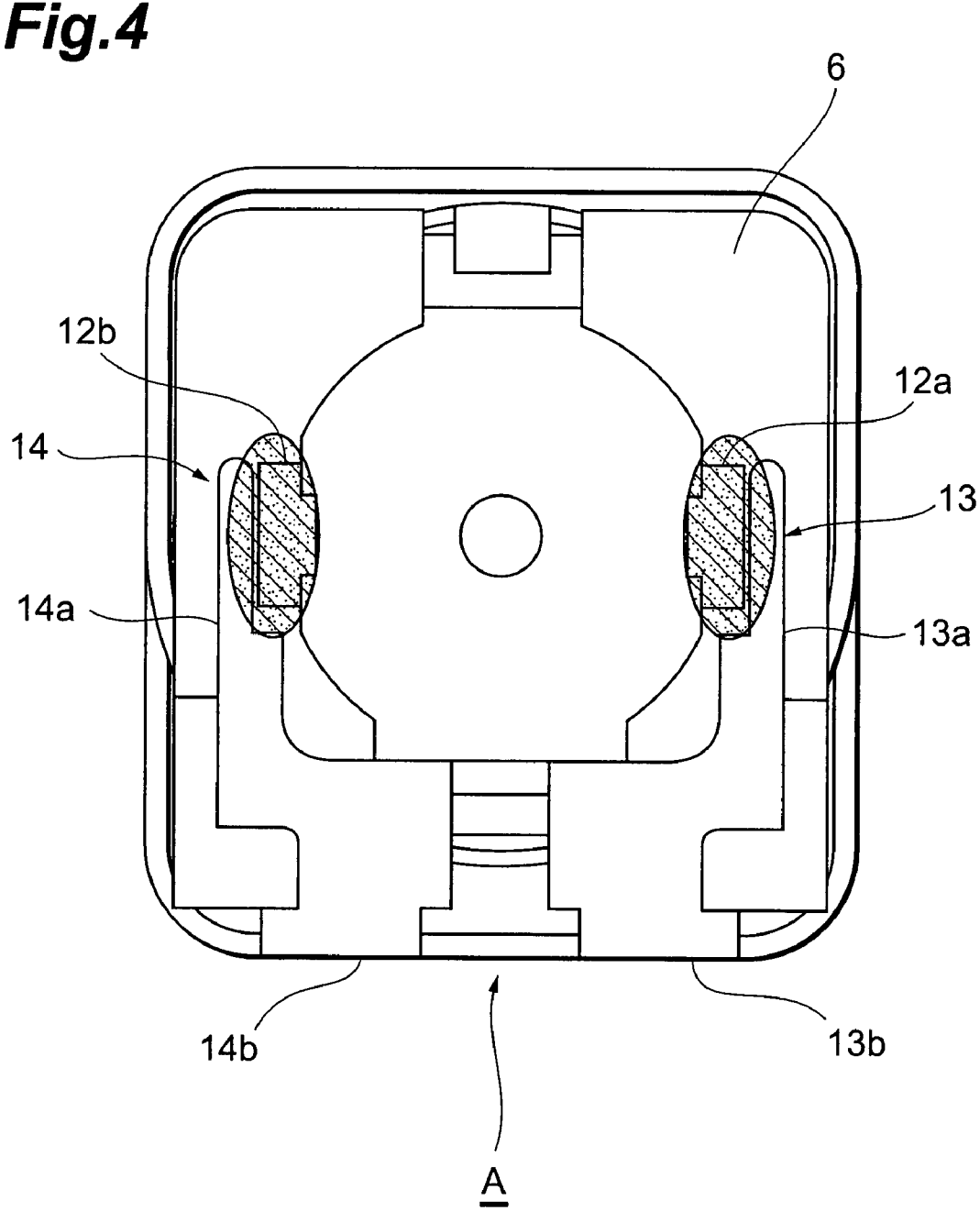
FIG. 4 is a rear view showing the embodiment of the vibration motor according to the present invention.

As shown in FIG. 2 and FIG. 5, a trapezoidal convex portion 16a whose tip is broadened and a concave portion 16b into which the trapezoidal convex portion 16a is fitted are formed in the joint 16 formed at the bottom 17 of the holder 3. The convex portion 16a and concave portion 16b are alternately lined up along a center line C2 extending in parallel with the axis of rotation C1 (See FIG. 1) of the shaft 7 and through the center of the bottom 17, and the convex portion 16a and concave portion 16b are fitted in with each other with a narrow slit 16c. The slit 16c runs from the front end to the rear end of the bottom 17. An outer wall surface 17a of the bottom 17 of the holder 3 is in contact with and reflow-soldered to the printed wiring board PWB.

A pair of right and left forward tilting prevention portions 17b and 17c extending up to a point facing the weight 8 is formed at the bottom 17, and each of the forward tilting prevention portions 17b and 17c extends in the center line C2 direction up to a position beyond the center of the weight 8. As shown in FIG. 5, each of the forward tilting prevention portions 17b and 17c has a part arranged in the same plane as the bottom 17 and a part arranged in the same plane as the flanks 18 and 19 respectively. In this case, material strength such as flexural strength and impact strength can be increased when compared with a case in which the forward tilting prevention portions are formed solely of flat plates. The pair of the forward tilting prevention portions 17b and 17c is symmetrical with respect to the center line C2 of the bottom 17 and a rectangular notch 17d is formed between the pair of the forward tilting prevention portions 17b and 17c. The notch 17d reaches, from the front end of the forward tilting prevention portions 17b and 17c beyond the rear end of the weight 8, a root of the neck 4a of the tubular case 2. As a result, a clearance between the weight 8 and forward tilting prevention portions 17b and 17c can be secured even if the shaft 7 is temporarily bent by receiving an external shock caused by, for example, a fall of the vibration motor 1.

As shown in FIG. 5 to FIG. 9, the holder 3 has front-and-rear pairs of claws 18a, 18b, 19a, and 19b in contact with an outer surface of the tubular case 2 formed on the right and left flanks 18 and 19 respectively, and each of the claws 18a, 18b, 19a, and 19b biases the tubular case 2 toward an inner wall surface 21a of the top 21. The front claws 18a and 19a are provided facing each other on the front side of the flanks 18 and 19, and the rear claws 18b and 19b are provided facing each other on the rear side of the flanks 18 and 19. The front claws 18a and 19a, each consisting of a rectangular piece, are bent from a fixed end on the top 21 side to a free end on the bottom 17 side so as to come closer to each other having a curved shape corresponding to the outer surface of the tubular case 2. Similarly, the rear claws 18b and 19b are bent so as to come closer to each other having the curved shape corresponding to the outer surface of the tubular case 2.

As shown in FIG. 1 to FIG. 4, the tubular case 2 is inserted from the rear end side of the holder 3, and the housing 4 is press-fitted between the four claws 18a, 18b, 19a, and 19b and the inner wall surface 21a of the top 21. Then, the bracket 6 is press-fitted into the rear end of the holder 3 and also the tubular case 2 is press-fitted into the holder 3 until the neck 4a protrudes from the front end of the holder 3. As a result, the tubular case 2 is firmly fixed inside the holder 3. Then, the weight 8 is fixed to the shaft 7. The housing 4 of the tubular case 2 is a metallic cylinder and the holder 3 has a rectangular cross-sectional shape, and thus contact places of the housing 4 and holder 3 will be the claws 18a, 18b, 19a, and 19b and portions of the top 21. Therefore, a contact area will be much smaller when compared with a case in which the whole inner wall surface of the holder 3 is in contact with the tubular case 2. The tubular case 2 is supported by the claws 18a, 18b, 19a, and 19b while being biased toward the inner wall surface 21a of the top 21, resulting in a state in which the tubular case 2 is lifted from the bottom 17. As a result, the radius of rotation of the weight 8 can be made larger than the tubular case 2 as long as not in contact with the bottom 17.

By adopting the aforementioned holder 3, it becomes harder to conduct heat to the tubular case 2 via the holder 3 during reflow-soldering, reducing an influence of heat on the vibration motor 1. Further, the tubular case 2 is lifted from the bottom 17 by the claws 18a, 18b, 19a, and 19b and, as a result, the bottom 17 and tubular case 2 are separated. Therefore, an influence of heat on the vibration motor 1 when reflow-soldering the bottom 17 to the printed wiring board PWB is further reduced.

Further, the vibration motor 1 to which the weight 8 is fixed is placed at a predetermined position on the printed wiring board PWB by a mounting machine. The mounting machine holds the vibration motor 1 by pressing an adsorption nozzle to suck against an outer wall surface 21b of the top 21 of the holder 3 and transports the vibration motor 1 to the predetermined position on the printed wiring board PWB. Since the outer wall surface 21b of the top 21 of the holder 3 is plane, suction by the adsorption nozzle is maintained in an excellent state.

The overall center of gravity of the conventional vibration motor (See Patent Document 1) deviates forward because of a heavy weight and thus the weight side is likely to tilt forward when the vibration motor is placed on a printed wiring board. However, since the pair of the forward tilting prevention portions 17b and 17c is provided on the weight 8 side at the bottom 17 of the holder 3, it is made more difficult for the weight 8 to tilt forward, with the forward tilting prevention portions 17b and 17c acting as a support. As a result, the vibration motor 1 is stabilized on the printed wiring board PWB and can be reliably soldered by reflow-soldering. As a result, solder can be made more unlikely to separate even if the vibration motor 1, incorporated in a portable communication apparatus such as a mobile phone or game machine such as a game controller, receives a dropping impact.

It is also made easier for the holder 3 to broaden outwardly by the slit 16c generated when the holder 3 is formed. However, the slit 16c is provided at the bottom 17 and thus the slit 16c can be arranged on the printed wiring board PWB when mounting the vibration motor 1 on the printed wiring board PWB. Therefore, broadening of the slit 16c can be stopped using solder by soldering the bottom 17 and printed wiring board PWB. Consequently, even when the vibration motor 1 receives a dropping impact, it becomes possible to prevent broadening of the holder 3 and to appropriately avoid the motor part A from protruding from the holder 3.

Further miniaturization of a small motor such as the vibration motor 1 is demanded, while on the other hand, upsizing of the weight 8 is demanded as well. Thus, by providing the notch 17d between the pair of the forward tilting prevention portions 17b and 17c on the center line C1 extending along the bottom 17, the radius of rotation of the weight 8 can be increased by board thickness of the bottom 17. This enables upsizing of the weight 8 in the centrifugal direction. If the radius of rotation of the weight 8 can be increased by board thickness even though the board thickness of the bottom 17 is, for example, less than 0.5 mm, the weight 8 can have extremely large influence on overall vibration by increasing the radius of rotation of the weight 8 only slightly due to smallness of the vibration motor 1. Therefore, the vibration motor 1 is very effective in promoting miniaturization.

Though the above embodiment has been described by assuming that the tubular case 2 is cylindrical, the vibration motor may have a tubular case whose cross section is oval-shaped.

Figure 10:
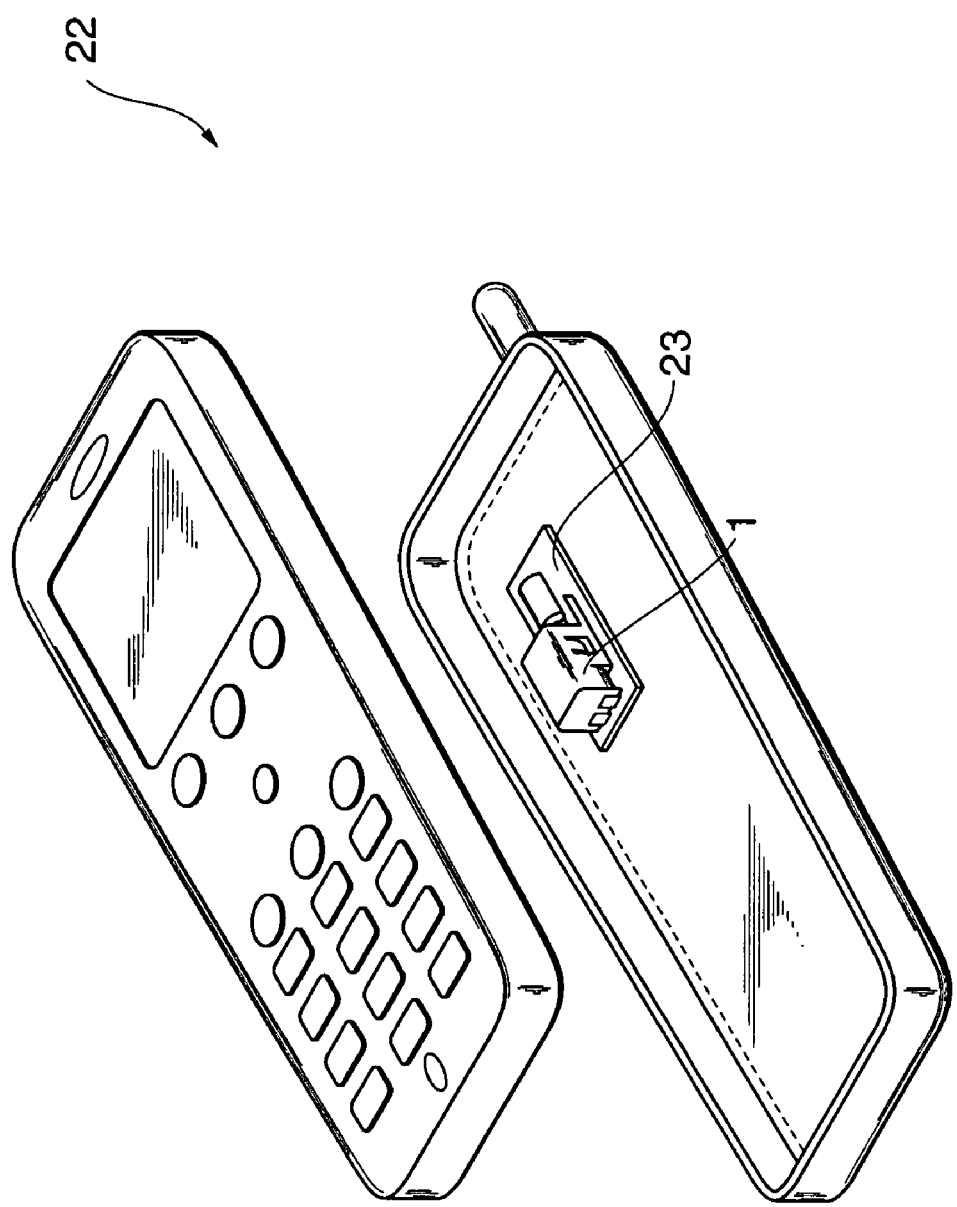
FIG. 10 is an exploded perspective view showing a mobile phone equipped with a wiring board on which a vibration motor is mounted.

Vibration motors according to the present invention are versatile and can be applied to various kinds of vibration annunciators. As shown in FIG. 10, for example, a wiring board 23 on which the vibration motor 1 is mounted is provided inside a mobile phone 22. Also, as shown in FIG. 11, a wiring board 25 on which the vibration motor 1 is mounted is provided inside a game controller 24, which is an example of game machine.

What is claimed is:

1. A vibration motor comprising:
   a tubular case accommodating a rotor and stator;
   a shaft protruding from a front end of the case;
   a weight eccentrically fixed to a front end of the shaft, the weight having a front end and a rear end; and
   a metallic holder surrounding the case, the holder being surface-mounted on a wiring board by reflow-soldering, wherein the holder includes:
      a main body having a planate bottom placed on the wiring board, a planate top, and a pair of flanks connecting the top and the bottom; and
      a pair of forward tilting prevention portions extending from the main body toward the weight in parallel with an axis of rotation of the shaft so as to face the weight, farthest ends of the forward tilting prevention portions not reaching the front end of the weight, and the rear end of the weight not reaching the main body,
   each of the forward tilting prevention portions including:
      a bottom portion extending from the bottom of the main body; and
      a flank portion erected from the bottom portion and extending from the flank of the main body.

2. The vibration motor according to claim 1, wherein the holder has a cross-section of a substantially rectangular shape formed by the bottom, the top, and the pair of flanks, and wherein the pair of flanks include respective claws that are in contact with an outer surface of the case and bias the case toward an inner wall surface of the top.

3. A vibration motor comprising:
   a tubular case accommodating a rotor and stator;
   a shaft protruding from a front end of the case;
   a weight eccentrically fixed to an end of the shaft; and
   a metallic holder surrounding the case, the holder being surface-mounted on a wiring board by reflow-soldering, wherein the holder includes:
      a planate bottom placed on the wiring board,
      a pair of forward tilting prevention portions formed on the weight side of the bottom, the pair of forward tilting prevention portions extending from the bottom toward the weight in parallel with an axis of rotation of the shaft so as to face the weight, and
      a notch formed between the pair of forward tilting prevention portions, the notch extending from a front end corresponding to farthest ends of the forward tilting prevention portions to the bottom beyond a rear end of the weight,
   wherein the holder has a cross-section of a substantially rectangular shape formed by the bottom, a pair of flanks erected from both sides of the bottom, and a top bridging the flanks, and
   wherein the pair of flanks have respective claws that are in contact with an outer surface of the case and bias the case toward an inner wall surface of the top.

4. The vibration motor according to claim 1, wherein the bottom of the holder has a slit extending from an end of the notch in the direction of the center line to a rear end of the bottom.

5. The vibration motor according to claim 3, wherein each of the forward tilting prevention portions has a flank portion erected from a bottom portion, the flank portion formed continuously from the corresponding flank of the holder.

6. A communication apparatus comprising a wiring board on which the vibration motor according to claim 3 is mounted.

7. A game machine comprising a wiring board on which the vibration motor according to claim 3 is mounted.

8. A vibration motor comprising:
   a tubular case accommodating a rotor and stator;
   a terminal protruding from the case;
   a shaft protruding from a front end of the case;
   a weight eccentrically fixed to an end of the shaft; and
   a metallic holder surrounding the case, the terminal and the holder being surface-mounted on a wiring board by reflow-soldering,
   wherein the holder includes:
      a planate bottom placed on the wiring board,
      a pair of forward tilting prevention portions formed on the weight side of the bottom, the pair of forward tilting prevention portions extending from the bottom toward the weight in parallel with an axis of rotation of the shaft so as to face the weight, and
      a notch formed between the pair of forward tilting prevention portions, the notch extending from a front end corresponding to farthest ends of the forward tilting prevention portions to the bottom beyond a rear end of the weight,
   wherein the holder has a cross-section of a substantially rectangular shape formed by the bottom, a pair of flanks erected from both sides of the bottom, and a top bridging the flanks, and
   wherein the pair of flanks have respective claws that are in contact with an outer surface of the case and bias the case toward an inner wall surface of the top.

* * * * *